US010836486B2

(12) United States Patent
Matus

(10) Patent No.: US 10,836,486 B2
(45) Date of Patent: Nov. 17, 2020

(54) CONTROLLING A DRONE THROUGH USER MOVEMENT

(71) Applicant: TEAL DRONES, INC., Salt Lake City, UT (US)

(72) Inventor: George Michael Matus, Salt Lake City, UT (US)

(73) Assignee: Teal Drones, Inc., Salt Lake City, UT (US)

( * ) Notice: Subject to any disclaimer, the term of this patent is extended or adjusted under 35 U.S.C. 154(b) by 26 days.

(21) Appl. No.: 16/176,172

(22) Filed: Oct. 31, 2018

(65) Prior Publication Data
US 2019/0135432 A1 May 9, 2019

Related U.S. Application Data

(60) Provisional application No. 62/581,977, filed on Nov. 6, 2017.

(51) Int. Cl.
B64C 39/02 (2006.01)
G05D 1/00 (2006.01)
G05D 1/10 (2006.01)
G06K 9/00 (2006.01)

(52) U.S. Cl.
CPC ......... B64C 39/024 (2013.01); G05D 1/0016 (2013.01); G05D 1/0044 (2013.01); G05D 1/101 (2013.01); G06K 9/00342 (2013.01); G06K 9/00362 (2013.01); B64C 2201/146 (2013.01)

(58) Field of Classification Search
CPC .......... B64C 39/024; B64C 2201/146; G06K 9/00362; G06K 9/00342; G05D 1/0016; G05D 1/101; G05D 1/0044
USPC .......................................................... 701/3
See application file for complete search history.

(56) References Cited

U.S. PATENT DOCUMENTS

2016/0349849 A1* 12/2016 Kwon ................... G06F 3/011
2018/0073889 A1* 3/2018 Vigilante ............... G06F 3/011

OTHER PUBLICATIONS

Lijun Zhao, Xiaoyu Li, Zhenye Sun, Ke Wang and Chenguang Yang "A Robot Navigation Method Based on Human-Robot Interaction for 3D Environment Mapping", Jul. 14-18, 2017, IEEE International Conference on Real-time Computing and Robotics (Year: 2017).*

* cited by examiner

Primary Examiner — Brian P Sweeney
(74) Attorney, Agent, or Firm — Workman Nydegger

(57) ABSTRACT

A computer system for mapping the movement of a user to the controls of a drone generates, with a mixed-reality device, a simultaneous localization and mapping coordinate system of a user environment. The system then receives, from sensors within the mixed-reality device, a movement variable that comprises an indication that the user has moved a first distance in a particular direction with respect to the simultaneous localization and mapping coordinate system. The system communicates, to the drone, a movement command to move a second distance and particular direction based upon information within the movement variable.

20 Claims, 4 Drawing Sheets

CONTROLLING A DRONE THROUGH USER MOVEMENT

CROSS-REFERENCE TO RELATED APPLICATIONS

This application claims the benefit of and priority to U.S. Provisional Application No. 62/581,977 entitled "CONTROLLING A DRONE THROUGH USER MOVEMENT" filed on Nov. 6, 2017, the entire contents of which is incorporated by reference herein in its entirety.

BACKGROUND

Unmanned aerial vehicles (UAVs) or drones have become increasingly popular in recent times. These drones can be controlled manually, or can fly autonomously according to a pre-programmed flight path. Because of these features, drones can be used in a variety of situations from work to recreation. For example, drones may be used to deliver objects from a warehouse to a purchaser's residence. Drones may also be flown for fun such as in parks or backyards. Still further, drones may be flown in competitions, racing through predesigned courses.

Today's drones come with guidance systems that help them to know their location, altitude and trajectory. Various sensors and radios are used to detect the drone's height, speed, and current position. These sensors may be used to help pilot a drone. Even with the advanced sensors utilized in modern drone platforms, controlling a drone still requires a certain level of expertise and practice. In many cases, the difficultly involved with controlling a drone can diminish the enjoyment of the overall experience.

There is a need for new methods and systems for controlling drones that distill the highly complex and multivariate nature of flying to a scheme that is easily understandable and useable by non-expert users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least one disclosed embodiment comprises a computer system for mapping the movement of a user to the controls of a drone. The computer system generates, with a mixed-reality device, a simultaneous localization and mapping coordinate system of a user environment. The system then receives, from sensors within the mixed-reality device, a movement variable that comprises and indication that the user has moved a first distance in a particular direction with respect to the simultaneous localization and mapping coordinate system. The system communicates, to the drone, a movement command to move a second distance and particular direction based upon information within the movement variable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In at least one disclosed embodiment, a user is able to control a drone through the user's interaction with a mixed-reality device. As used herein, a mixed-reality device comprises any electronic device that is configured for use in generating a mixed-reality environment, such as a virtual-reality or augmented-reality space. Further, in at least one embodiment, a mixed-reality device refers to any electronic device that is capable of simultaneous localization and mapping (SLAM). As used herein, a SLAM system comprises an electronic system that extracts landmarks from an environment, estimates a state based upon the landmarks, and updates the user's state and the landmarks over time.

In at least one embodiment, a user utilizes a mixed-reality device to generate a SLAM coordinate system. Once the SLAM coordinate system is established, the mixed-reality device tracks the user's movements within the user's environment, using the SLAM coordinate system. The user's movements are used to directly control the drone. For example, as the user walks forward, the drone moves forward. When the user turns left the drone turns left. When the user speeds up, the drone speeds up.

The ability to map the user's movements within a SLAM system to the controls of the drone provides several significant advantages and overcomes several technical challenges. For example, instead of merely relying upon IMUs, such as gyroscopes and accelerometers, utilizing a SLAM coordinate system provides a significantly more accurate tracking system. Many conventional IMU sensors suffer from sensor drift making it difficult to track a user's motion relying solely upon the IMU.

Some conventional systems utilize GPS sensors to attempt to correct sensor drift. One will appreciate, however, that GPS sensors are only useable outdoors when satellites are visible. Additionally, GPS sensors lack both high accuracy and high-speed response time. In contrast, controlling a drone through a SLAM system provides highly accurate detection of a user's movements at a high-rate of speed.

Further, in at least one embodiment, once a drone is controlled by a user's movements within a SLAM coordinate system, additional mixed-reality elements can be incorporated into the drone flight system. For example, a mixed-reality headset might display information to a user through a head-mounted display. The user can then physically move in response to the information on the head-mounted display, which in turn can cause the drone to move in cooperation with the user. In this way, the user, the drone, and the mixed-reality environment are all synchronized.

Figure 1:
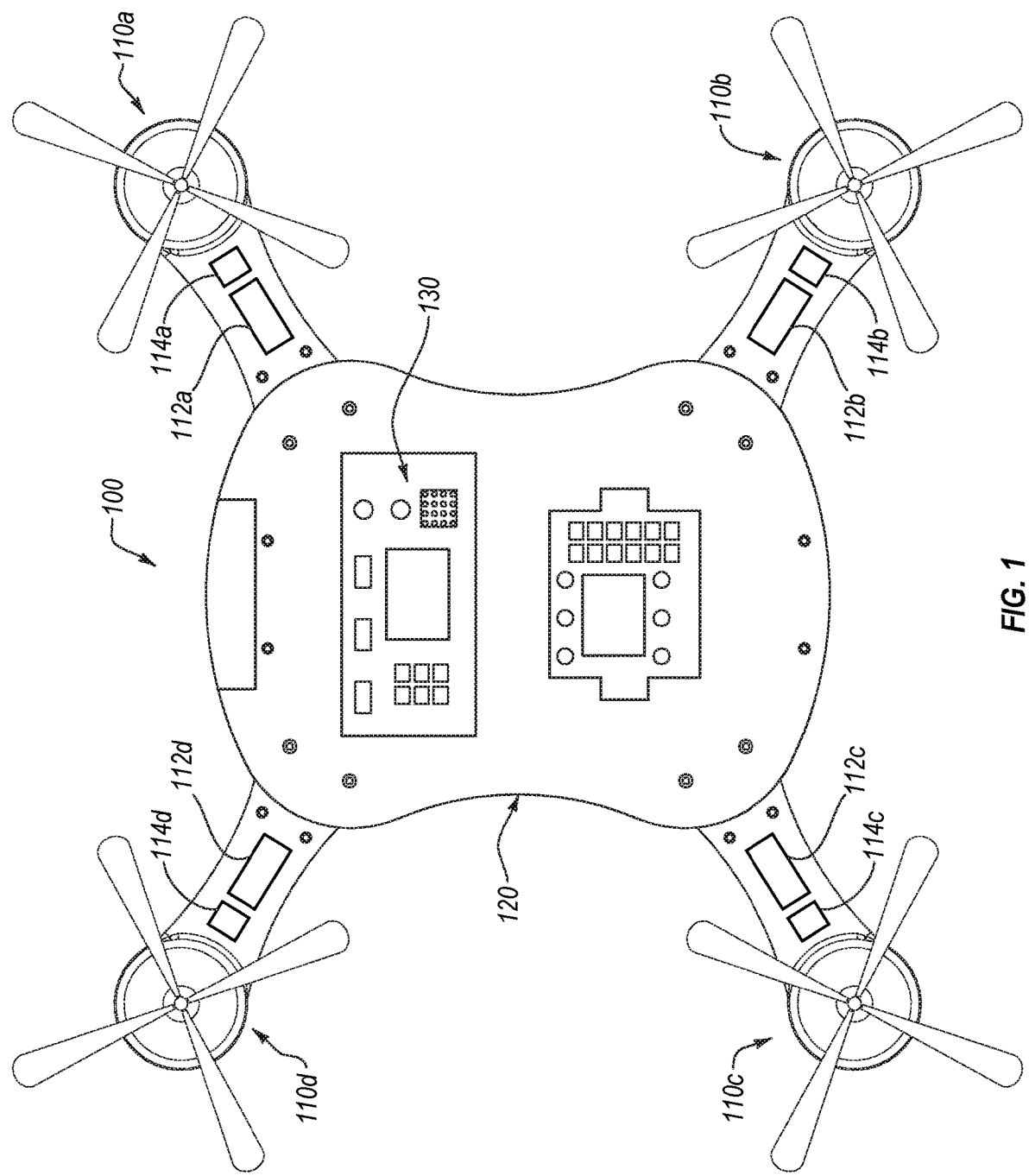
FIG. 1 illustrates an embodiment of a drone.

Turning to the figures, FIG. 1 illustrates a drone 100 with modular arms 110(a-d) in accordance with embodiments of the present invention. In particular, the depicted drone 100 comprises multiple arms 110(a-d) attached to a vehicle body 120. Additionally, the depicted drone 100 comprises a processing unit in the form of flight control unit 130 within the vehicle body 120. The flight control unit 130 comprises sensors for controlling the quadrotor (e.g., altimeter, gyroscopes, GPS, sonar, etc.), along with various control and processing modules (e.g., CPU, radio, antenna, GPU, etc.) In at least one additional or alternative embodiment, the flight control unit 130 and/or associated sensors are otherwise located or dispersed through the drone 100.

As such, the processing unit receives positional sensor data and provides flight controls based, at least in part, upon the received positional sensor data. For example, in at least one embodiment, the processing unit receives data from gyroscopes and accelerometers. Using the received sensor information, the processing unit controls the flight of the quadrotor using a control system, such as a PID loop.

As stated above, one will understand that the depicted drone 100 is merely exemplary. Additional or alternate embodiments of the present invention may comprise rotor-based remote flight systems with less than four arms 110(a-d) or rotor-based remote flight systems with more than four arms 110(a-d). Additionally, various embodiments of the present invention may comprise different physical configurations (such as fixed-wing configurations), construction materials, proportions, and functional components. For instance, rotor-based remote flight platforms may comprise a mixture of components such as cameras, sonars, laser sights, GPS, various different communication systems, and other such variations.

Figure 2:
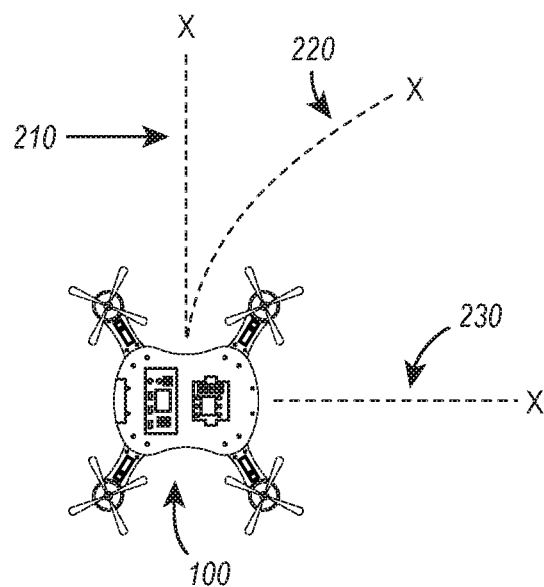
FIG. 2 illustrates a schematic of an embodiment of a user controlling a drone.
Figure 2:
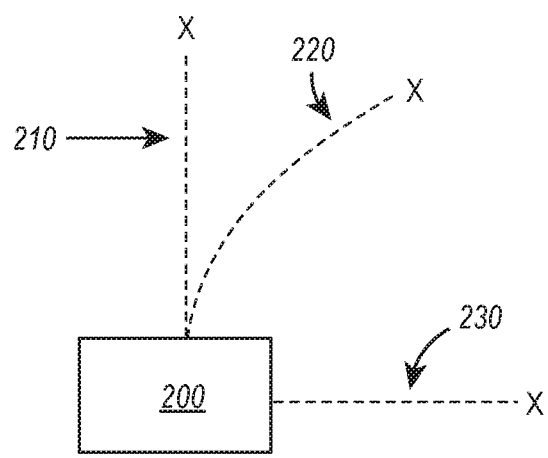

FIG. 2 illustrates a schematic of an embodiment of a user controlling a drone 100. In particular, FIG. 2 depicts a mixed-reality device 200 sending control signals to the drone 100. In at least one embodiment, the mixed-reality device 200 is being held in the user's hands, as in the case of a smart phone, or is otherwise attached to the user, as in the case of a head-mounted display. One will appreciate that in addition to tracking a user's movements using the SLAM coordinate system, a mixed-reality equipped smart phone can also incorporate data received from other sensors, such as an IMU and GPS, when generating commands for the drone 100.

For example, in the case that the mixed-reality device 200 comprises a mixed-reality equipped smart phone that has generated a SLAM coordinate system, the user first initiates the SLAM coordinate system. In order to operate with the mixed-reality equipped smart phone, the user may need to point the smart phone at the ground. Once the mixed-reality equipped smart phone is pointed at the ground, it generates a SLAM coordinate system. As the user continues to point the mixed-reality equipped smart phone at the ground and then moves forward, backwards, side-to-side, up and down, the mixed-reality equipped smart phone is able to track the user's movements and communicate those movements to the drone 100 for control. Additionally, in at least one embodiment, the mixed-reality equipped smart phone is also able to track the rotation and tilt, such that rotation and tilt commands can be sent to the drone 100.

As shown in FIG. 2, as the user and the associated mixed-reality device 200 move forward 240, the drone also moves forward 210. Similarly, as the user and the associated mixed-reality device 200 move sideways 260, the drone also moves sideways 230. As depicted, as the user and the associated mixed-reality device 200 move both forward and sideways 250, the drone 100 moves both forward and sideways 220. In additional or alternative embodiments, the mixed-reality device 200 can similarly generate commands based upon the height at which the user is holding mixed-reality device 200. For example, as the user raises the mixed-reality device 200 the drone 100 gains elevation. As the user lowers the mixed-reality device 200 the drone loses elevation.

Figure 3:
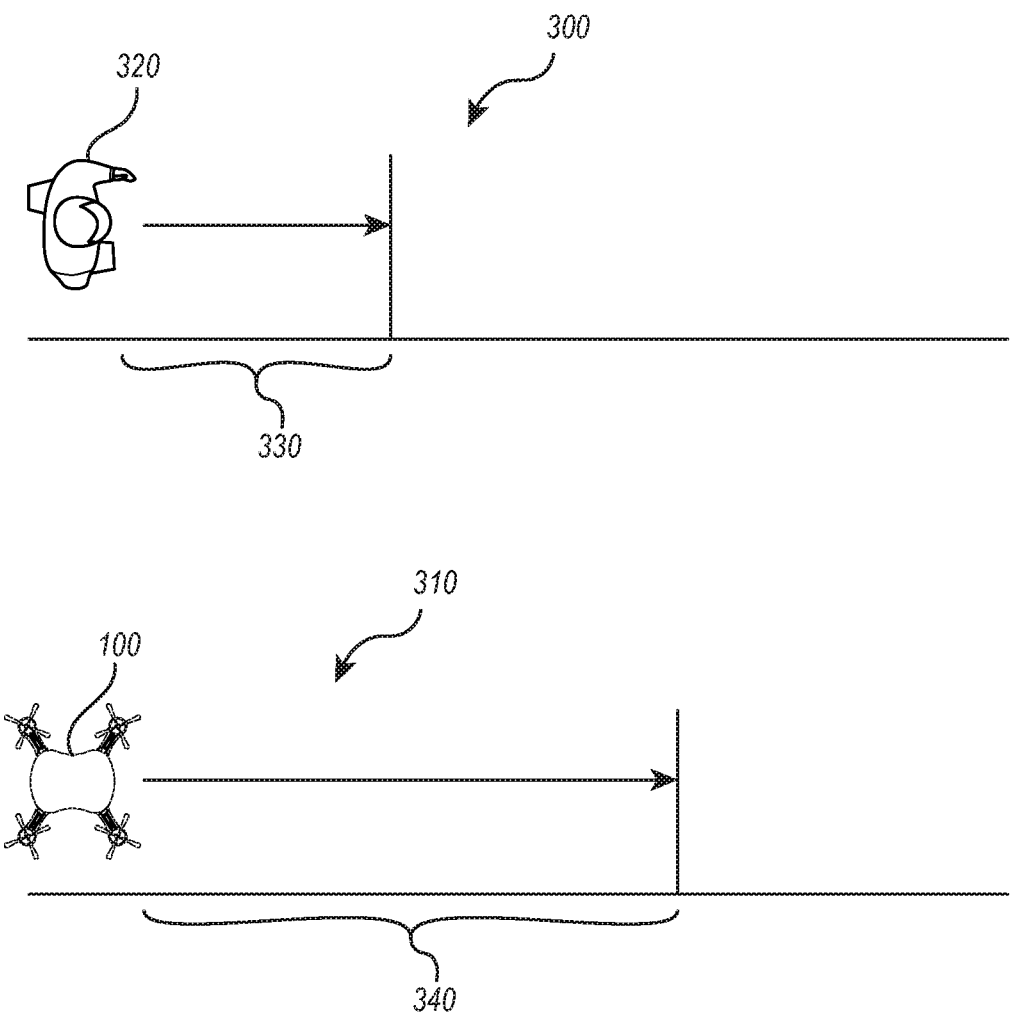
FIG. 3 illustrates a schematic of another embodiment of a user controlling a drone.

FIG. 3 illustrates a schematic of another embodiment of a user 320 controlling a drone 100. For the sake of clarity, in this embodiment, a user 320 is depicted as controlling the drone 100, but one will appreciate that in practice, a mixed-reality device 200 that is associated with the user 320 is generating the actual commands.

The user 320 is shown moving forward a specific distance 330 in the user's environment 300. As the user 320 moves forward the specific distance 330, the mixed-reality device 200 tracks the user's movement through a SLAM coordinate system. In response to the detected movements, the mixed-reality device 200 communicates coordinating movements to the drone 100. As depicted in response to the user 320 moving forward, the mixed-reality device 200 communicates a corresponding movement command to the drone 100.

In at least one embodiment, the mixed-reality device performs a scaling to the distance 330 that the user 320 walked before communicating the corresponding command to the drone 100. For example, the mixed-reality device 200 commands the drone 100 to fly a distance 340 that is three times further of than the distance 330 that the user 320 moved. Similar scaling can be performed to the user's speed of movement, acceleration, altitude, and other movement variables. The amount of scaling may be user-defined, defined based upon flight conditions, based upon a defined flying area, or by some other means. Further, in at least one embodiment, no scaling may be used such that there is a one-to-one relationship between movement of the user 320 and movement of the drone 100.

Accordingly, in at least one embodiment, when controlling a drone 200, a user 320 first generates, with a mixed-reality device 200, a SLAM coordinate system of a user environment. As the user moves, the mixed-reality device 200 receives, from sensors within the mixed-reality device 200, a movement variable that comprises an indication that the user 320 has moved a first distance 330 in a particular direction with respect to the simultaneous localization and mapping coordinate system. The mixed-reality device 200 then communicates, to the drone 100, a movement command to move a second distance 340 and in a particular direction based upon information within the movement variable.

Similarly, in at least one embodiment, the mixed-reality device 200 receives, from sensors within the mixed-reality device 200, a speed variable that comprises an indication that the user 320 has moved at a first speed with respect to the simultaneous localization and mapping coordinate system. The mixed-reality device 200 then communicates, to the drone 100, a speed command to move at a second speed based upon information within the speed variable.

Further, in at least one embodiment, the mixed-reality device 200 receives, from sensors within the mixed-reality device 200, a direction variable that comprises an indication that the user 320 has changed a direction of movement within the simultaneous localization and mapping coordinate system. The mixed-reality device 200 then communicates, to the drone 100, a turn command to turn in a first direction based upon information within the direction variable.

In the various different or additional embodiments described above, a scaling factor may be applied to any of the variables or motions. Additionally, different scaling factors may be applied based upon the variable type. For example, some variables may have no scaling, such as the direction variable, while other variables may have different scalings such as a two-to-one scaling for speed and a three-to-one scaling for distance. In some embodiments, none of the variables are scaled.

Figure 4:
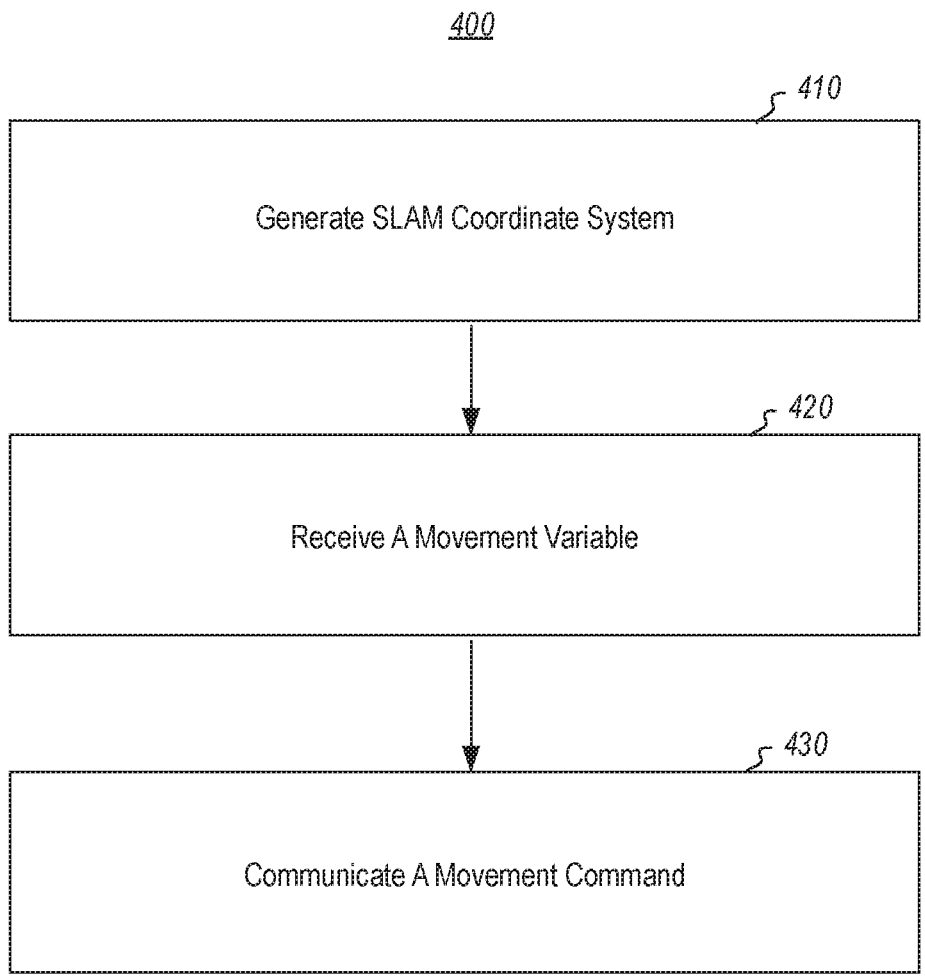
FIG. 4 illustrates a flow chart of steps within an embodiment of a method for controlling a drone.

FIG. 4 illustrates a flow chart of steps within an embodiment of a method 400 for controlling a drone. The method 400 comprises an act 410 of generating a SLAM coordinate system. Act 410 comprises generating, with a mixed-reality device 200, a simultaneous localization and mapping coordinate system of a user environment. For example, as depicted and described with respect to FIG. 2, a mixed-reality device 200 scans an environment for landmarks. Based upon the landmarks, the mixed-reality device 200 is able to track its localized movement within the environment.

Additionally, the method 400 includes an act 420 of receiving a movement variable. Act 420 comprises receiving, from sensors within the mixed-reality device, a movement variable that comprises and indication that the user has moved a first distance in a particular direction with respect to the simultaneous localization and mapping coordinate system. For example, as depicted and described with respect to FIG. 3, a user 320 moves a first distance 330. A mixed-reality device 200 associated with the user tracks the movement.

The method 400 also includes an act 430 of communicating a movement command. Act 430 comprises communicating, to the drone 100, a movement command to move a second distance 340 and particular direction based upon information within the movement variable. For example, as depicted and described with respect to FIG. 3, a user 320 moves a first distance 330. In response, the mixed-reality device 200 communicates to the drone 100 a command to move a second distance 340. The second distance being a scaled distance of the first distance.

Accordingly, embodiments disclosed herein provide a novel solution for user-control of a drone 100. In at least one embodiment, the user's actual movements are translated into corresponding commands for the drone 100. For example, the user's movements can control the drone's speed, altitude, direction, and distance of travel. Further, the user of a SLAM coordinate system for controlling the drone provides several unique technical benefits. For example, the use of a SLAM coordinate system mitigates sensor drift and provide information that may not be available in all environments (e.g., GPS indoors).

Additionally, in at least one embodiment, mapping the user's movements to a drone with a SLAM coordinate system also provides several technical improvements with mixed-reality incorporation into drone flight. For example, a user may wear a head-mounted display that shows information relating to the flight of the drone 200. The user's own reactions can then be used to control the drone in view of the information on the head-mounted display.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available. Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for mapping a movement of a user to controls of a drone comprising:
   one or more processors at a mixed-reality device; and
   one or more computer-readable media having stored thereon executable instructions that when executed by the one or more processors configure the computer system to perform at least the following:
      generate, with the mixed-reality device, a simultaneous localization and mapping coordinate system of a user environment;
      receive, from sensors within the mixed-reality device, a movement variable that comprises an indication that the user has moved a first distance in a particular direction with respect to the simultaneous localization and mapping coordinate system; and
      communicate, to the drone, a movement command to move a second distance and second direction based upon information within the movement variable.

2. The computer system of claim 1, wherein the executable instructions include instructions that are executable to configure the computer system to:
   receive, from the sensors within the mixed-reality device, a speed variable that comprises an indication that the user has moved at a first speed with respect to the simultaneous localization and mapping coordinate system; and
   communicate, to the drone, a speed command to move at a second speed based upon information within the speed variable.

3. The computer system of claim 2, wherein the second speed is determined based upon a scaling of the first speed.

4. The computer system of claim 3, wherein an amount of the scaling is user-defined.

5. The computer system of claim 1, wherein the executable instructions include instructions that are executable to configure the computer system to:
   receive, from the sensors within the mixed-reality device, a direction variable that comprises an indication that the user has changed a direction of movement with respect to the simultaneous localization and mapping coordinate system; and
   communicate, to the drone, a turn command to turn in a new direction based upon information within the direction variable.

6. The computer system of claim 1, wherein the first distance and the second distance are the same.

7. The computer system of claim 1, wherein the second distance is determined based upon a scaling of the first distance.

8. The computer system of claim 1, wherein the sensors comprise a GPS sensor.

9. The computer system of claim 1, wherein the particular direction and the second direction are the same.

10. A computer system for mapping a movement of a user to controls of a drone comprising:
- one or more processors at the drone; and
- one or more computer-readable media having stored thereon executable instructions that when executed by the one or more processors configure the computer system to perform at least the following:
  - receive, from a mixed-reality device, a command to move a particular distance and particular direction based upon information within a movement variable, wherein the command is generated by:
    - generating, with the mixed-reality device, a simultaneous localization and mapping coordinate system of a user environment;
    - receiving, from sensors within the mixed-reality device, the movement variable that comprises an indication that the user has moved a first distance in a particular direction with respect to the simultaneous localization and mapping coordinate system; and
    - receiving, from the mixed-reality device, the command to move a second distance in the particular direction based upon information within the movement variable.

11. The computer system of claim 10, wherein the executable instructions include instructions that are executable to configure the computer system to:
- cause the drone to move in the particular distance and in the particular direction.

12. A computer-implemented method executed by one or more processors at a mixed-reality device, the computer-implemented method mapping a movement of a user to controls of a drone, the computer-implemented method comprising:
- generating, with the mixed-reality device, a simultaneous localization and mapping coordinate system of a user environment;
- receiving, from sensors within the mixed-reality device, a movement variable that comprises an indication that the user has moved a first distance in a particular direction with respect to the simultaneous localization and mapping coordinate system; and
- communicating, to the drone, a movement command to move a second distance and second direction based upon information within the movement variable.

13. The computer-implemented method of claim 12, further comprising:
- receiving, from the sensors within the mixed-reality device, a speed variable that comprises an indication that the user has moved at a first speed with respect to the simultaneous localization and mapping coordinate system; and
- communicating, to the drone, a speed command to move at a second speed based upon information within the speed variable.

14. The computer-implemented method of claim 13, wherein the second speed is determined based upon a scaling of the first speed.

15. The computer-implemented method of claim 12, further comprising:
- receiving, from the sensors within the mixed-reality device, a direction variable that comprises an indication that the user has changed a direction of movement with respect to the simultaneous localization and mapping coordinate system; and
- communicating, to the drone, a turn command to turn in a new direction based upon information within the direction variable.

16. The computer-implemented method of claim 12, wherein the first distance and the second distance are the same.

17. The computer-implemented method of claim 12, wherein the second distance is determined based upon a scaling of the first distance.

18. The computer-implemented method of claim 17, wherein an amount of the scaling is user-defined.

19. The computer-implemented method of claim 12, wherein the particular direction and the second direction are the same.

20. The computer-implemented method of claim 12, wherein the sensors comprise a GPS sensor.

* * * * *